United States Patent
Jeoung

(10) Patent No.: US 10,291,769 B2
(45) Date of Patent: May 14, 2019

(54) METHOD FOR CONTROLLING ONE-TOUCH CALL MODE OF MOBILE TERMINAL

(71) Applicants: Openvacs Co., Ltd., Seoul (KR); Young Min Jeoung, Gimpo-si (KR)

(72) Inventor: Young Min Jeoung, Gimpo-si (KR)

(73) Assignees: Young Min Jeoung (KR); OPENVACS CO., LTD. (KR)

( * ) Notice: Subject to any disclaimer, the term of this patent is extended or adjusted under 35 U.S.C. 154(b) by 575 days.

(21) Appl. No.: 14/907,901

(22) PCT Filed: Jul. 30, 2014

(86) PCT No.: PCT/KR2014/006963
§ 371 (c)(1),
(2) Date: Mar. 4, 2016

(87) PCT Pub. No.: WO2015/016594
PCT Pub. Date: Feb. 5, 2015

(65) Prior Publication Data
US 2016/0205240 A1    Jul. 14, 2016

(30) Foreign Application Priority Data
Aug. 1, 2013  (KR) .................. 10-2013-0091281

(51) Int. Cl.
*H04M 1/725*    (2006.01)
*G06F 3/0481*    (2013.01)
(Continued)

(52) U.S. Cl.
CPC ...... *H04M 1/72583* (2013.01); *G06F 3/0482* (2013.01); *G06F 3/04817* (2013.01);
(Continued)

(58) Field of Classification Search
CPC .......... H04M 1/7258; H04M 1/72519; H04M 15/8016; H04M 15/8022; H04M 15/8044;
(Continued)

(56) References Cited

U.S. PATENT DOCUMENTS 4,585,904 A * 4/1986 Mincone ............... H04M 15/00
                                                   379/114.01
4,891,836 A * 1/1990 Takahashi ................ H04N 1/34
                                                   379/100.04
(Continued)

FOREIGN PATENT DOCUMENTS

KR    1020100133245 A    12/2010
KR    1020110012830 A    2/2011
KR    101182731 B1    10/2012

OTHER PUBLICATIONS

Oh, W. S. "[app. review] 4 kinds of free calling application for Android," Sep. 17, 2011, Retrieved from: http://web.archive.org/web/20110917074911/http://www.bloter.met/archives/69106.
(Continued)

*Primary Examiner* — Stella Higgs
(74) *Attorney, Agent, or Firm* — Mendelsohn Dunleavy, P.C.

(57) ABSTRACT

A method for controlling a one-touch call mode of a mobile terminal, in which a user can select the call quality of a voice call in consideration of a calling rate. The user interface of the mobile terminal for the selection occupies only a minimum area, providing a small, efficient user interface. The method includes steps of: displaying, on one section of a touch screen, a one-touch call mode switching menu for switching between voice mode and data communication mode when the user makes a selection; and displaying, adjacent to the switching menu on the touch screen, rate per hour information predetermined according to a region for the voice mode or the data communication mode, as selected
(Continued)

by the user. The rate per hour information is displayed as calculated with reference to the mode and the selected region, whenever the voice mode and the data communication mode are switched.

11 Claims, 10 Drawing Sheets

(51) Int. Cl.

| | |
|---|---|
| H04L 12/14 | (2006.01) |
| H04M 15/00 | (2006.01) |
| H04W 4/24 | (2018.01) |
| G06F 3/0482 | (2013.01) |
| G06F 3/0484 | (2013.01) |
| G06F 3/0488 | (2013.01) |
| H04L 12/24 | (2006.01) |
| H04M 1/24 | (2006.01) |
| H04M 1/253 | (2006.01) |

(52) U.S. Cl.
CPC ...... *G06F 3/04842* (2013.01); *G06F 3/04845* (2013.01); *G06F 3/04883* (2013.01); *H04L 12/1439* (2013.01); *H04L 12/1496* (2013.01); *H04L 41/5038* (2013.01); *H04M 1/72519* (2013.01); *H04M 15/8016* (2013.01); *H04M 15/8022* (2013.01); *H04M 15/8044* (2013.01); *H04M 15/8055* (2013.01); *H04M 15/83* (2013.01); *H04M 15/84* (2013.01); *H04M 15/846* (2013.01); *H04M 15/85* (2013.01); *H04M 15/851* (2013.01); *H04W 4/24* (2013.01); *H04M 1/24* (2013.01); *H04M 1/2535* (2013.01); *H04M 2250/22* (2013.01)

(58) Field of Classification Search
CPC .. H04M 15/8055; H04M 15/83; H04M 15/84; H04M 15/846; H04M 15/85; H04M 15/851; H04M 1/24; H04M 1/2535; H04M 2250/22; G06F 3/04817; G06F 3/0482; G06F 3/04842; G06F 3/04845; G06F 3/04883; H04L 12/1439; H04L 12/1496; H04L 41/5038; H04W 4/24
See application file for complete search history.

(56) References Cited

U.S. PATENT DOCUMENTS

| | | | | |
|---|---|---|---|---|
| 5,099,507 | A * | 3/1992 | Mukai | H04M 1/275 340/7.1 |
| 5,388,203 | A * | 2/1995 | Kaneko | G06F 3/0481 715/837 |
| 5,933,475 | A * | 8/1999 | Coleman | H04B 17/0085 379/1.02 |
| 6,157,648 | A * | 12/2000 | Voit | H04L 12/1421 370/354 |
| 6,775,267 | B1 * | 8/2004 | Kung | H04L 12/14 370/352 |
| 6,823,302 | B1 * | 11/2004 | Atkinson | G10L 25/69 379/1.02 |
| 7,831,025 | B1 * | 11/2010 | Francis | H04M 3/2236 379/1.01 |
| 2004/0122684 | A1 * | 6/2004 | Kaikuranta | G06Q 30/0283 705/38 |
| 2006/0064700 | A1 * | 3/2006 | Ludvig | H04N 5/445 719/318 |
| 2007/0028189 | A1 * | 2/2007 | Robbins | G06F 3/0481 715/853 |
| 2008/0045179 | A1 * | 2/2008 | Bekanich | H04M 1/0256 455/405 |
| 2008/0166999 | A1 * | 7/2008 | Guedalia | H04M 15/00 455/406 |
| 2008/0274715 | A1 * | 11/2008 | Heit | H04M 15/00 455/406 |
| 2009/0068984 | A1 * | 3/2009 | Burnett | H04M 1/663 455/408 |
| 2009/0111459 | A1 * | 4/2009 | Topaltzas | H04W 24/00 455/423 |
| 2010/0130177 | A1 * | 5/2010 | Ku | H04M 15/00 455/414.1 |
| 2010/0156813 | A1 * | 6/2010 | Duarte | G06F 3/0488 345/173 |
| 2012/0207035 | A1 * | 8/2012 | Simha | H04L 41/5035 370/252 |
| 2013/0065555 | A1 * | 3/2013 | Baker | G06Q 20/105 455/410 |
| 2013/0072126 | A1 * | 3/2013 | Topaltzas | H04W 24/08 455/67.11 |

OTHER PUBLICATIONS

"OTO Global International Telephone Call Application—Cheap, Reasonable International Telephone Call App!" Jun. 11, 2013, Retrieved from: http://web.archive.org/web/20130611010346/http://leader1935.tistory.com/107.

* cited by examiner

METHOD FOR CONTROLLING ONE-TOUCH CALL MODE OF MOBILE TERMINAL

TECHNICAL FIELD

The present invention generally relates to a method for controlling a mobile terminal and, more particularly, to a method for controlling a one-touch call mode of a mobile terminal, which selects, by one-touch, one of a voice mode based on an existing voice communication network and a data communication network based on a data communication network, and displays, on a touch screen, tariff per hour information for the selected communication mode to allow a user of the mobile terminal to select call quality for cost.

BACKGROUND ART

Mobile terminals such as a mobile phone and a smartphone fundamentally perform a voice communication function using wireless networks provided by mobile service providers. However, recently such devices additionally provide a messenger function for transmitting and receiving messages through wireless networks as well as a multimedia function for playing back media files or capturing images with a camera. Since a user carries the mobile terminal to perform voice communication or video communication, the size of the mobile terminal is required to be small and thin. In order to satisfy such requirements, the size of a touch screen, which is mainly used as an input device for the mobile terminal, is limited to a size of several inches.

Accordingly, in order to satisfy contradictory conditions that the size remains small and thin while user convenience is enhanced, the menu structure of a mobile terminal has developed differently than that of a personal computer.

Korean Patent Application Publication No. 10-2010-0133245 discloses a method for controlling a mobile terminal for allowing two icons displayed on a touch screen to overlap while some areas thereof do not overlap and are exposed, and for allowing one of an upper icon or a lower icon to be selected according to touch pressure applied by a user to the overlapping area. However, in the method disclosed in Korean Patent Application Publication No. 10-2010-0133235, since one of the overlapping icons is required to be selected according to the touch pressure, such an icon selection method may cause inconvenience to the user.

Furthermore, although the functions of the mobile terminal extend with several functions added thereto, voice communication (or video communication) is still the main function. When a mobile terminal performs voice communication through a wireless communication network (e.g. CDMA network) provided by mobile service providers, the mobile terminal may carry burden of paying for call cost in proportion to call time. Regarding this, Internet-based free call services, such as Skype provided by Daesung holdings, Korea, or the international service Ofee, are widely used.

The foregoing services are mainly provided in a manner that wireless communication networks provided by mobile service providers are minimally used or Internet phone services are used in order to reduce call costs.

In many cases, customers want better call quality even if it requires paying more, but the above-described services or applications have limitations to satisfy such customer demands. Accordingly, a mobile terminal user requires: a communication service having excellent call quality for cost without depending only on exiting wireless communication networks provided by the mobile service providers; and a more convenient interface to use such communication services.

DISCLOSURE

Technical Problem

Accordingly, the present invention has been made keeping in mind the above problems occurring in the prior art, and an object of the present invention is to provide: a method for controlling a one-touch call mode of a mobile terminal, which enables a user to select call quality of voice communication in consideration of an acceptable call cost; and a user interface for the selection to be conveniently used in a small and thin mobile terminal.

Technical Solution

In order to accomplish the above object, the present invention provides a method for controlling one-touch call mode of a mobile terminal. The method includes: displaying, on one area of a touch screen, a one-touch call mode switching menu for alternately switching between a voice mode and a data communication mode at each user selection; and displaying, adjacently to the one-touch call mode switching mode, tariff per hour information prescribed according to a user-selected area for a user-selected mode between the voice mode and the data communication mode, wherein the tariff per hour information is calculated with reference to the user-selected mode and the user-selected area to be displayed on the touch screen every time the voice mode and the data communication mode are switched.

In order to accomplish the above object, the present invention provides a method for controlling a one-touch call mode of a mobile terminal, the method including: displaying, on a touch screen, a one-touch call mode switching menu for alternately switching between a voice mode and a data communication mode at each user selection, and a call mode setting menu; displaying tariff per hour information respectively corresponding to the voice mode and the data communication mode on the touch screen every time the one-touch call mode switching menu is selected by the user; and displaying, on the touch screen, a call quality test menu for receiving test voice signals respectively corresponding to the voice mode and the data mode from a test server, which is connected through a wireless network, and playing back the test voice signals.

Advantageous Effects

According to the present invention, a mobile terminal user can select the call quality of a voice call in consideration of a proper call cost, and a user interface of the mobile terminal for the selection is allowed to occupy only a minimum area in the mobile terminal. Accordingly a small and efficient user interface can be implemented.

BEST MODE

Figure 1:
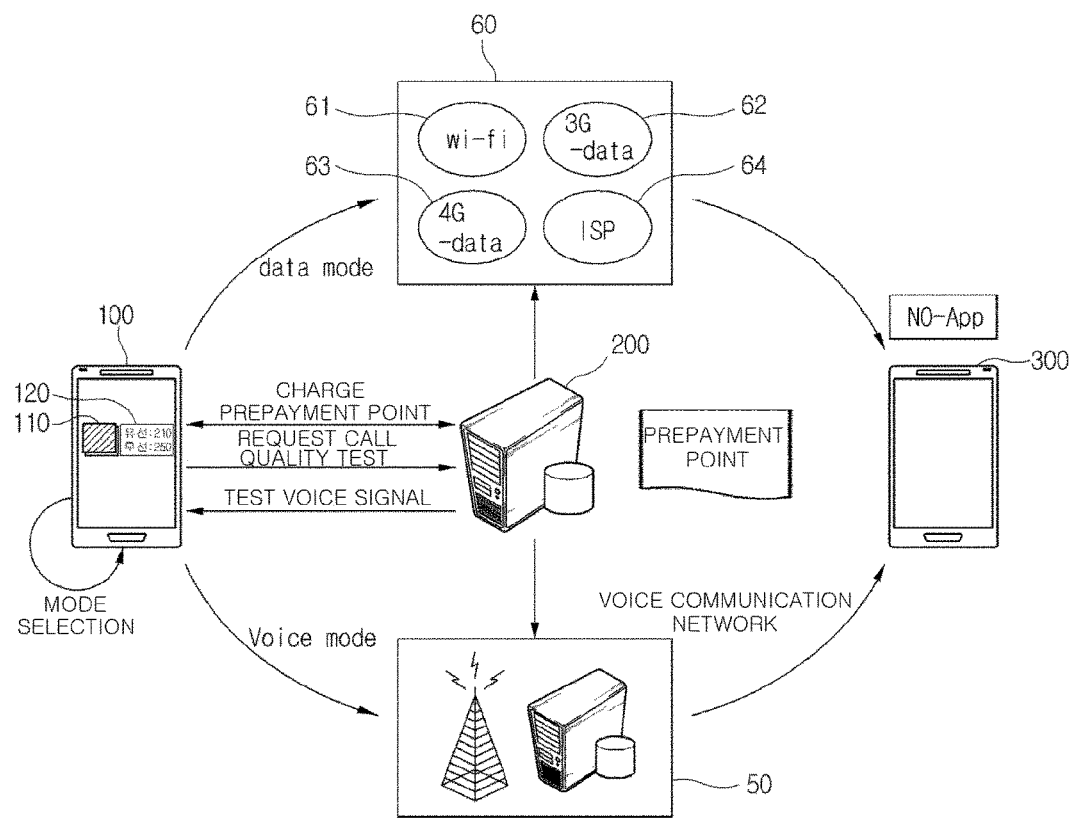
FIG. 1 illustrates a conceptual diagram of a method for controlling a one-touch call mode of a mobile terminal according to an embodiment of the present invention.

Reference should now be made to the drawings, in which the same reference numerals are used throughout the different drawings to designate the same or similar components.

A mobile terminal described herein may mean a mobile phone, smartphone, personal digital assistant (PDA), and a device including a touch screen and which is capable of performing voice communication and data communication in a code division multiple access (CDMA) or global system for mobile communication (GSM) manner. Hereinafter, a mobile terminal will be described on the basis of a smartphone including a touch screen as an input device.

"Tariff per hour information" described herein may mean a charging time unit for call cost charged to a mobile terminal user by the applicant per unit time (e.g. 1 second, 3 seconds, 5 seconds, 10 seconds, 30 seconds, 1 minute, and 3 minutes, etc.).

For example, when the tariff per hour information is 25 won, the unit time is 1 minute, and the call time is 10 minutes, the total call cost to be paid by the mobile terminal user is 250 won and the tariff per hour information at this point is 25 won.

A "voice mode" described herein may mean a mode in which a mobile terminal performs voice communication by using voice communication networks of mobile service providers.

In many cases, a mobile service provider provides a free call time to a mobile terminal according to a payment system of the mobile terminal, and a voice mode may correspond to a mode for providing better quality voice communication at a low cost by using the free call time provided to the mobile terminal by the mobile service provider.

The "voice mode" may use voice communication networks provided by mobile service providers for voice communication. However, in order to reduce the call cost spent on voice communication, the voice mode may be configured by combining a part of the public switched telephone network (PSTN) or data communication network. However, the voice mode basically refers to a mode for maximally using a dedicated wireless network provided by the mobile service provider.

A "data communication mode" corresponds to a mode for providing an Internet call service for performing voice communication domestically or globally through the Internet.

Based on the Internet call service, the data communication mode may be configured by using a wireless fidelity (Wi-Fi) network, 3-generation (3G) data network, long term evolution (LTE, 4G) data network, etc. However, since the data communication mode mainly uses the data communication network provided for data transmission, quality of voice communication may be slightly lower than that of the voice mode. In addition, in the data communication mode, since a voice signal transmitted from an originator terminal to a receiver terminal has a data packet type, packets corresponding to an originator voice are not sequentially transmitted to the receiver terminal, and since these packets are to be combined to generate a voice, a transfer speed of the voice signal transmitted from the originator terminal to the receiver terminal may be decreased.

However, in the data communication mode, the originator terminal may transmit and receive a voice signal to and from the receiver terminal at any place where the internet is connected, and may transmit and receive a voice signal, even when the originator terminal or the receiver terminal is not provided with the same app. Instead, sound quality may be lowered in comparison to the voice mode in which the dedicated wireless network is used.

Hereinafter, embodiments of the present invention will be described in detail with reference to the accompanying drawings.

FIG. 1 illustrates a conceptual diagram of a method for controlling one-touch call mode of a mobile terminal according to an embodiment of the present invention.

Referring to FIG. 1, in a method for controlling one-touch call mode of a mobile terminal (hereinafter referred to "call mode control method") according to an embodiment of the present invention, on the basis of a service system 200 for providing a free international call service by the applicant, an originator mobile terminal 100 and a receiver mobile terminal 300 are connected to a wireless network, the originator mobile terminal 100 is connected to the service system 200 to charge a cost for using a free international call service, and the service system 200 accumulates a prepayment point, which corresponds to money deposited by the originator mobile terminal 100, to an account of the originator mobile terminal 100. Thereafter, when the originator mobile terminal 100 uses, in a voice mode, a voice communication network 50 provided by mobile service providers, the service system 200 may provide the prepayment point (or cost corresponding to the prepayment point) to a network provider operating the voice communication network 50 of the mobile service providers. On the other hand, when the originator mobile terminal 100 uses a data communication mode, the service system 200 may subtract the prepayment point only in a case where the originator mobile terminal 100 and the receiver mobile terminal 200 use data communication networks 62 and 63 of the mobile service providers. A service fee for the data communication networks 62 and 63 may be provided to the mobile service providers as a prepayment point (or cost corresponding thereto) by the subtracted prepayment point. Here, when a data communication network 60 is the Internet 64 provided by Internet service providers (ISPs), or a Wi-Fi network 61, the prepayment point accumulated to the account of the originator mobile terminal 100 may not be necessarily paid for the cost for using wired and wireless communication networks, but the prepayment point may be subtracted and paid to the service system 200, which provides an internet call service, as a service fee.

Here, the prepayment point may be purchased from the service system 200 by the originator mobile terminal 100 in cash or through account transfer and credit card payment.

In other words, the prepayment point substitutes for cash. A communication cost may be processed in a manner that a prepayment point may be subtracted from the prepayment point accumulated to the originator mobile terminal 100 every time voice communication is performed through the originator mobile terminal 100 with the receiver mobile terminal 300 in negotiation with the mobile service providers in advance, and a part of or the entirety of the subtracted prepayment point is provided to the mobile service providers.

On the other hand, the service system 200 may provide a test voice signal for enabling the originator mobile terminal 100 to select a call mode as well as provide a prepayment point purchase service with the originator mobile terminal 100.

The call mode means the voice mode and the data communication mode. As described above, the voice mode corresponds to a mode in which the originator mobile terminal 100 provides a voice call service on the basis of the voice communication network 50 of the mobile service providers, and the data communication mode may be mainly configured with a Wi-Fi network, 3G data network, and 4G data network. Since the data communication mode basically allows the originator mobile terminal 100 to perform internet call with the receiver mobile terminal 300, a data communication fee may be incurred. Then the service system 200, which provides the internet call service between the originator mobile terminal 100 and the receiver mobile terminal 300, may collect a charge for the service and a usage fee for using the data communication networks 62 and 63 of the mobile service providers may be incurred.

The voice mode and data communication mode may be realized through an app manufactured and distributed by the applicant. A one-touch call mode switching menu, through which the voice mode and communication mode may be switched on the main interface screen of the app distributed for user convenience, may be displayed on the touch screen, and every time the one-touch call mode switching menu displayed on the touch screen is selected, in other words, every time the user applies a touch input on the touch screen, the voice mode and the data communication mode may be alternately switched. Considering that the sizes of the touch screens, which are provided in the originator mobile terminal and the receiver mobile terminal 300, are limited, such an interface may reduce the number of menus displayed on the app interface and improve user convenience since the user is not required to search and select between the voice mode and the data communication mode.

In addition, tariff per hour information may be displayed adjacent to the one-touch call mode switching menu. The tariff per hour information may mean a communication cost for unit time (e.g. 1 second, 3 seconds, 5 seconds, 10 seconds, 30 seconds, 1 minute, and 3 minutes, etc.). The tariff per hour information may be multiplied with a call time to be used for calculating a communication cost to be paid by the originator mobile terminal 100, when voice communication is performed from an area in which the originator mobile terminal 100 is located to an area in which the receiver mobile terminal 300 is located.

While the originator mobile terminal 100 pays for the communication cost in Republic of Korea, the originator mobile terminal 100 and the receiver mobile terminal 300 pay for half and half in the USA. Accordingly, in an area in which the communication charge system is like that in USA, the originator mobile terminal 100 and the receiver mobile terminal 300 may pay half and half for a prepayment point for the communication cost. A payment method of the prepayment point may differ according to an area in which the originator mobile terminal 100 or the receiver mobile terminal 300 is located, and is not limited.

FIGS. 2 to 9 illustrate reference diagrams according to an example of an app interface screen explained through FIG. 1.

Figure 2:
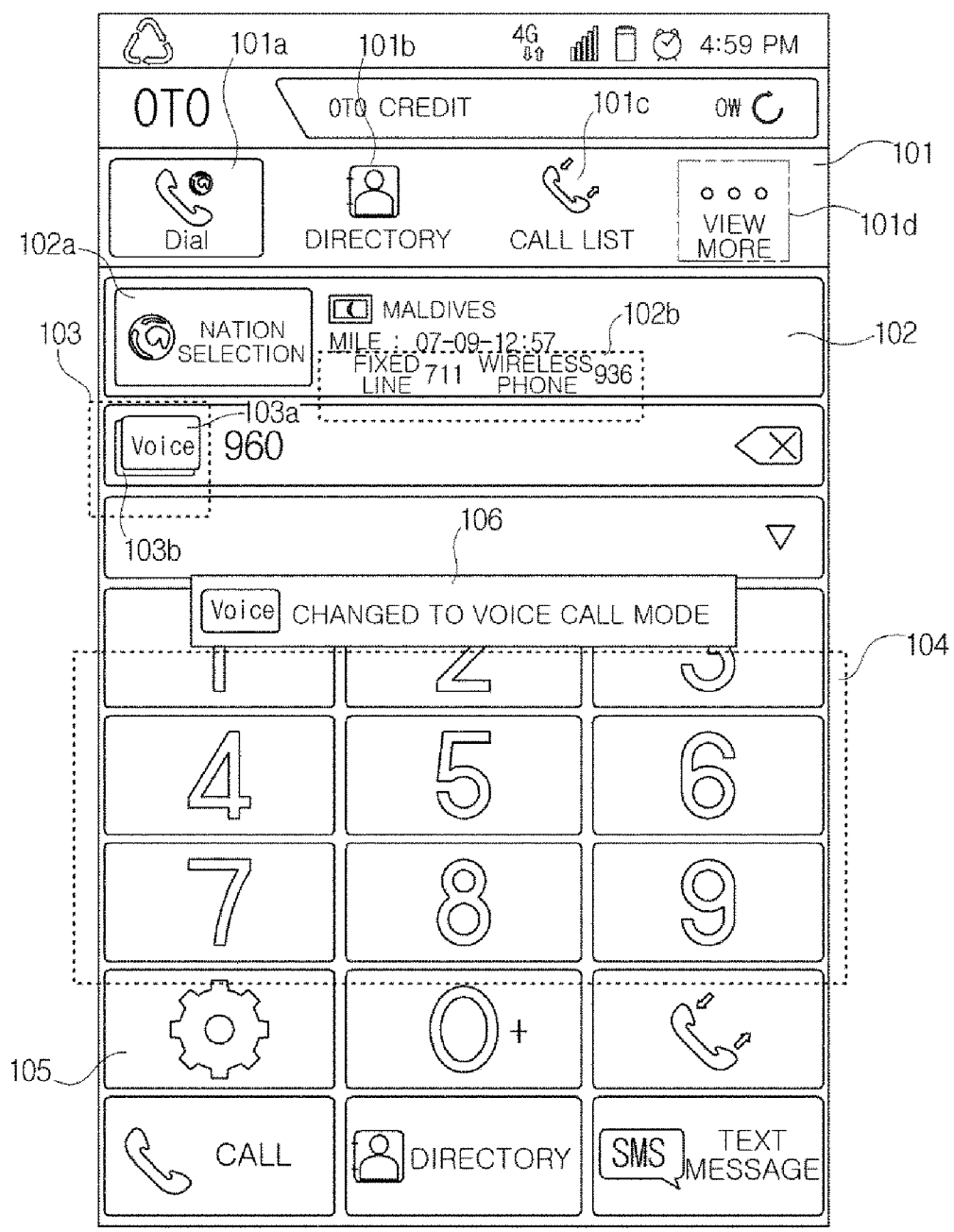
FIGS. 2 to 9 illustrate reference diagrams according to an example of an app interface screen explained in FIG. 1.

Firstly, FIG. 2 illustrates the main interface screen of an app. Referring to FIG. 2, the main interface screen may be configured with a main menu 101, which includes a dial menu 101a, a directory menu 101b, a call list menu 101c, and a view more menu 101d, an area selection menu 101, a one-touch call mode switching menu 103, a dial input menu 104, and a call mode setting menu 105. A call mode guiding message 106 may be displayed on the dial input menu 104 every time the one-touch call mode switching menu 103 is selected by the user. The displayed call mode guiding message 106 indicates which call mode is the user-selected call mode, and may be displayed on the touch screen every time the call mode is changed by a user touch input, and may be cleared from the touch screen after a predetermined time (e.g. 0.5 second or 5 seconds) passes.

The one-touch call mode switching menu 103 is configured with an icon 103a corresponding to the voice mode and an icon 103b that corresponds to the data communication mode and which overlaps the icon 103a.

Parts of the two overlapping icons 103a and 103b do not overlap and are exposed and the exposed parts are provided in order not to receive an additional touch input by the user, but to allow a user of the originator mobile terminal 100 or the receiver mobile terminal 300 to perceive that the one-touch call mode switching menu 103 is configured with a plurality of icons 103a and 103b.

The user of the originator mobile terminal 100 or the receiver mobile terminal 300 may perceive a corresponding icon 103 to be configured with two or more icons 103a and 103b through the non-overlapping parts. Every time the one-touch call mode switching menu 103 is selected by the user, in other words, every time a touch input is applied by the user, the icons 103a and 103b corresponding to the voice mode and the data communication mode are alternately switched and displayed. At this point, in the area selecting menu 102, the tariff per hour information 102b may be displayed according to the communication mode. The tariff per hour information may have different values according to a reception area (e.g. Maldives in FIG. 2) selected through the area selecting menu 102 and also have different values according to the communication mode (i.e. voice mode and data communication mode) in addition to the reception area.

Accordingly, when the user of the originator mobile terminal 100 or the receiver mobile terminal 300 selects a reception area through the app interface screen and selects a call mode through the one-touch call mode switching menu 103, the tariff per hour information 102b, which corresponds to the reception area and the call mode, may be displayed on the area selecting menu 102.

When the call mode setting menu 105 is selected by the user, sub menus for information about the call mode or quality, a quality test for each call mode, usage details for each mode, a charge comparison, and contact management may be displayed on the touch screen.

Figure 3:
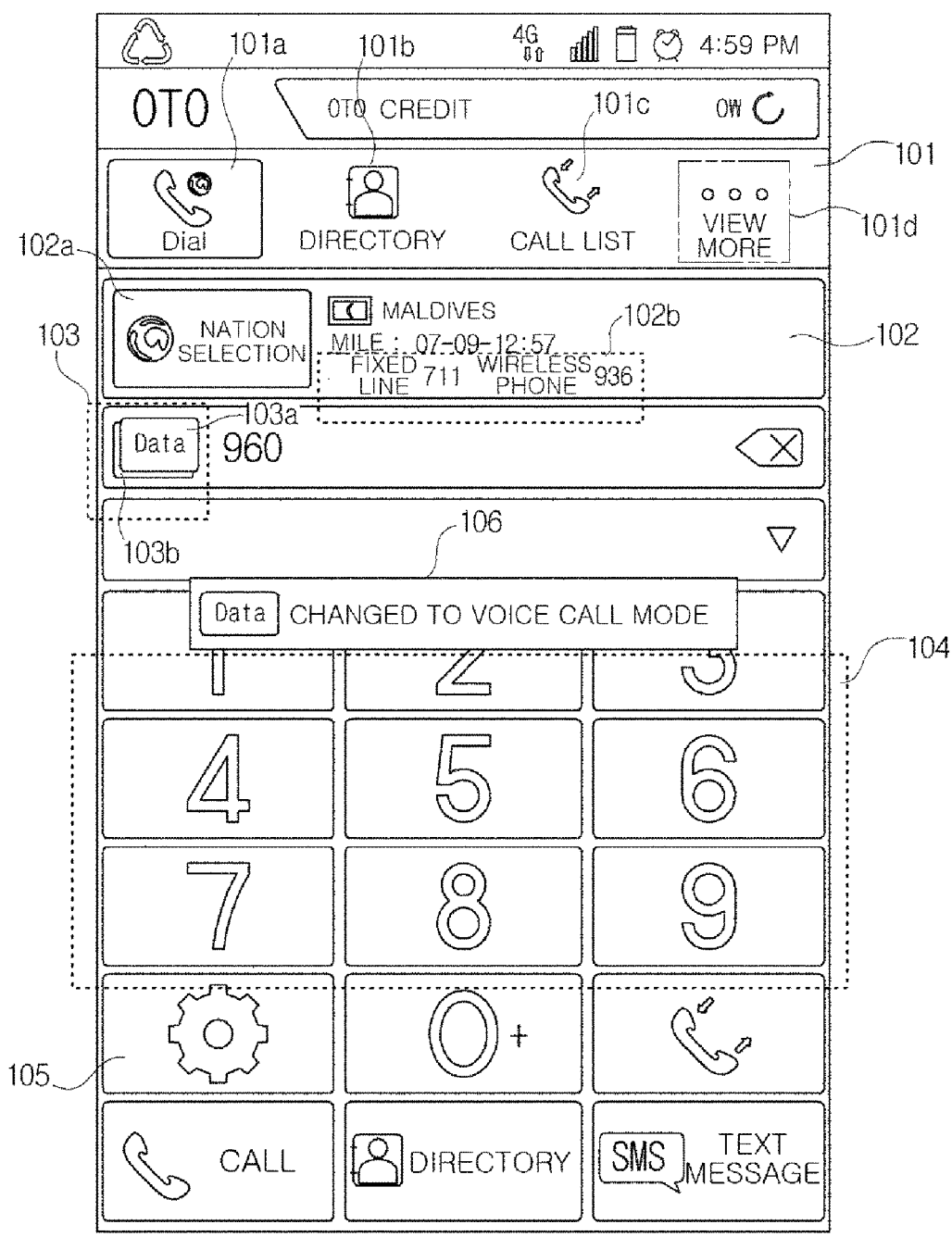

Next, FIG. 3 illustrates an example of switching from the voice mode to the data communication mode, when the one-touch mode switching menu 103 is selected by the user.

Referring to FIG. 3, when the app interface is switched from the voice mode to the data communication mode, the icon 103a corresponding to the voice mode is switched to the icon 103b corresponding to the data communication mode, and the icon 103b of the data communication mode 103b is displayed on the interface screen instead of the icon 103a of the voice mode having been displayed on the interface screen in FIG. 2. At this point, in the area selecting menu 102, the tariff per hour information 102b may be displayed according to the reception area selected through the originator mobile terminal 100 and the call mode selected by the user of the originator mobile terminal 100. At this point, the call mode guiding message 106, which indicates whether the data communication mode is switched, may be displayed for a predetermined time (e.g. 0.5 to 5 seconds) on the touch screen.

Figure 4:
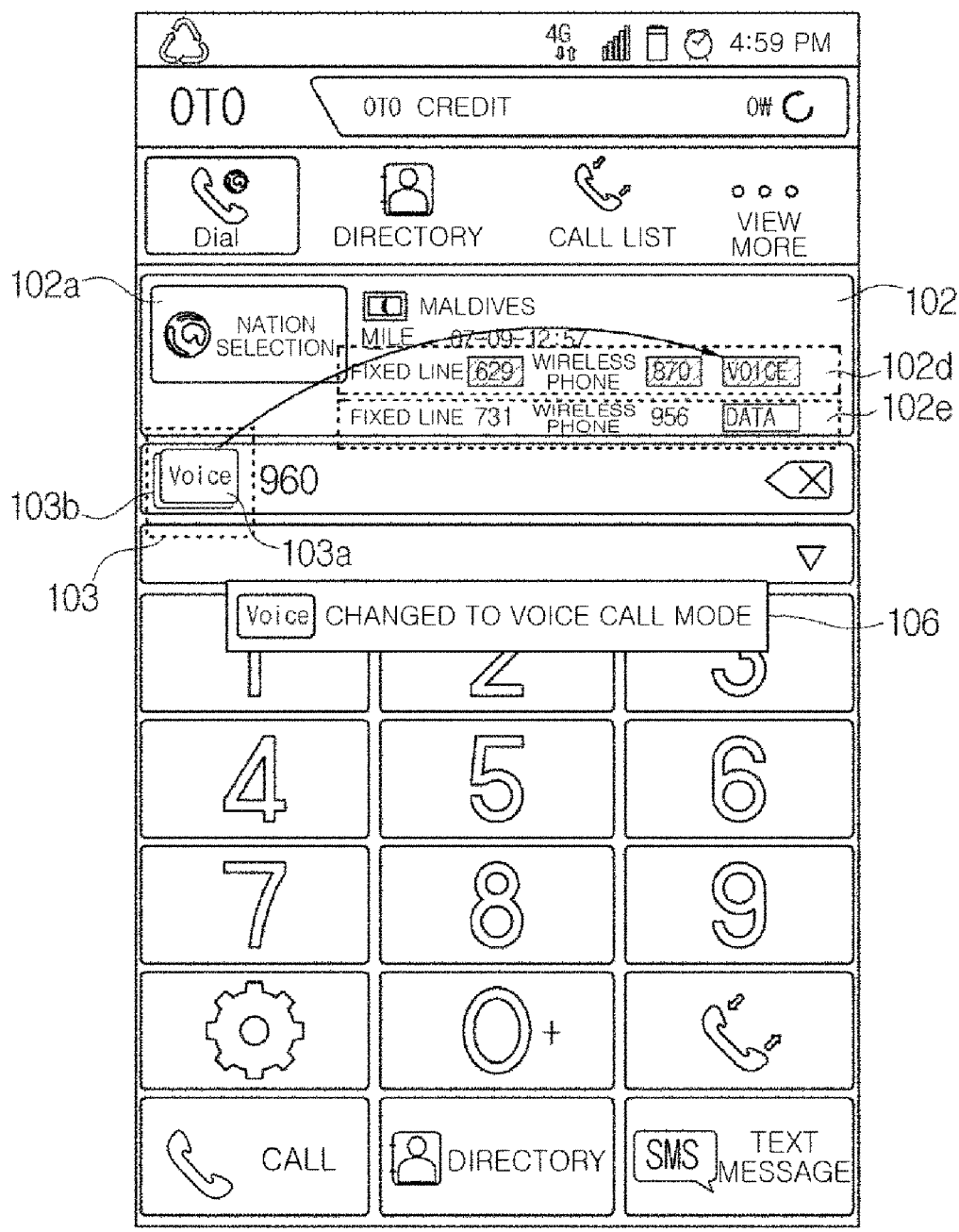

FIG. 4 illustrates another example of the main interface screen of the app. On the main interface screen, the area selecting menu 102 and the one-touch call mode switching menu 103 may be displayed and on the area selecting menu 102, the tariff per hour information 102d for the voice mode and the tariff per hour information 102e for the data communication mode may be displayed together. At this point, the tariff per hour information (i.e. one of 102d and 102e), which corresponds to a user-selected call mode between the tariff per hour information 102d and 102e, may be highlighted and differently displayed from the call mode that is not selected by the user. Here, the highlighting may be displayed such that:

1) the tariff per hour information for the user-selected call mode (i.e. one of the voice call mode and the data communication mode) flickers;

2) the tariff per hour information for the user-selected call mode is displayed in a bold character type; or 3) the tariff per hour information for the user-selected call mode may be displayed in a different color from that of the tariff per hour information for the call mode that is not selected by the user.

In the embodiment of FIG. 4, the tariff per hour information 102d and 102e for the voice mode and the data communication mode is displayed on the touch screen, and a user-selected one of the displayed tariff per hour information 102d and 102e is highlighted to allow the user of the originator mobile terminal 100 to compare the tariff per hour information 102d and 102e and select one rate.

Figure 5:
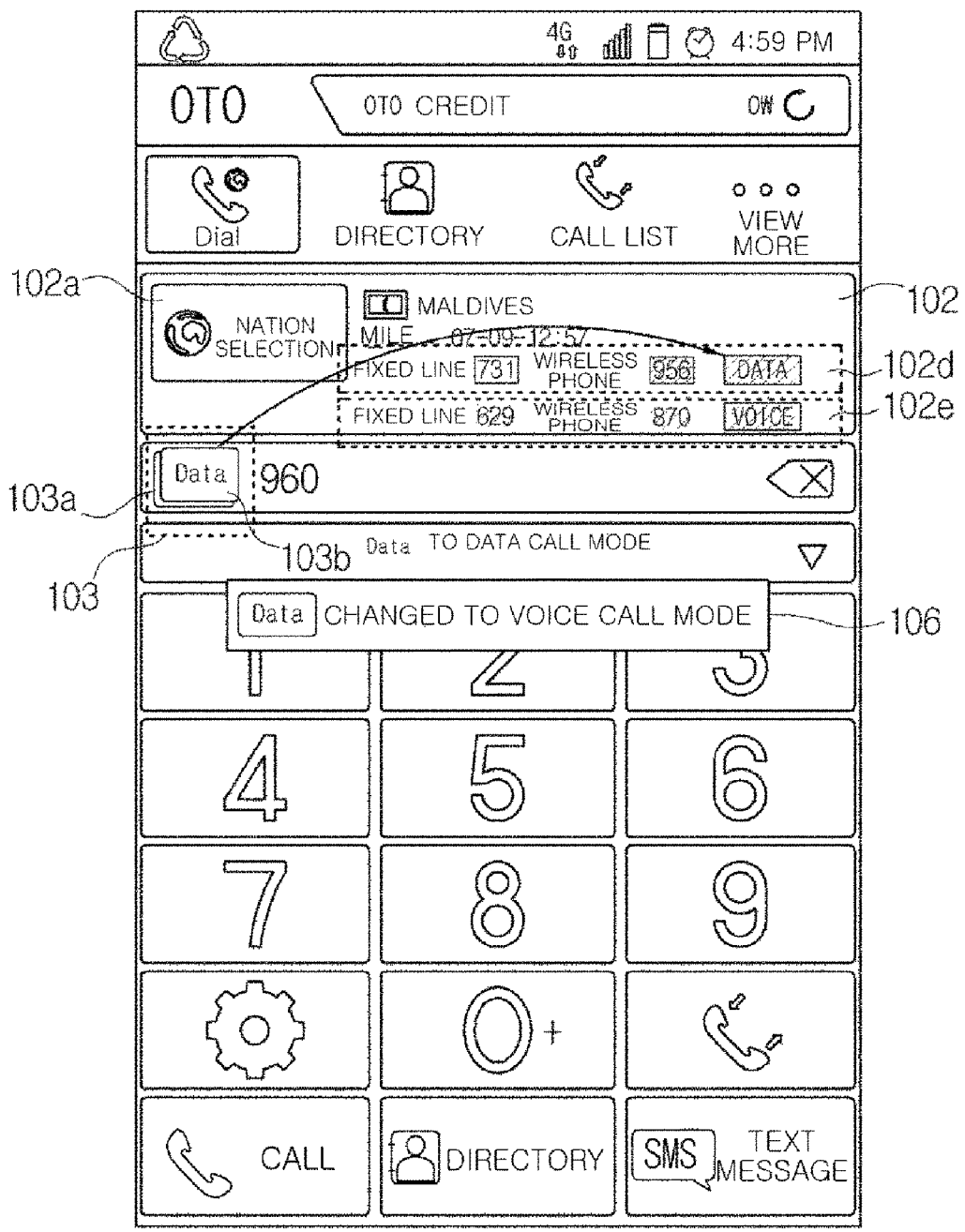

FIG. 5 illustrates an example when the one-touch call mode switching menu 103 is selected by the user in the embodiment of FIG. 4 and the call mode is switched.

Referring to FIG. 5, when the one-touch call mode switching menu 103 is selected by the user, the icon 103b for the data communication mode is exposed on the touch screen and the icon 103a for the voice mode having been exposed on the touch screen in FIG. 4 is switched to a hidden state.

In FIG. 5, the user-selected call mode is the data communication mode, and on the touch screen, the tariff per hour information 102d corresponding to the data communication mode may be displayed. However, when the tariff per hour information 102d corresponding to the data communication mode is selected by the user, the tariff per hour information 102e and a position for the voice communication mode may be switched and displayed.

It may be seen that if in FIG. 4, the tariff per hour information 102d for the voice mode and the tariff per hour information 102e for the data communication mode are sequentially arrayed, In FIG. 5, the tariff per hour information 102e for the data communication mode and the tariff per hour information 102d for the data communication mode are sequentially arrayed. In other words, in order to improve distinguishability for the user, the display sequence of tariff per hour information may be such that a user-selected mode is at an upper side and a mode not selected by the user may be at a lower side.

Figure 6:
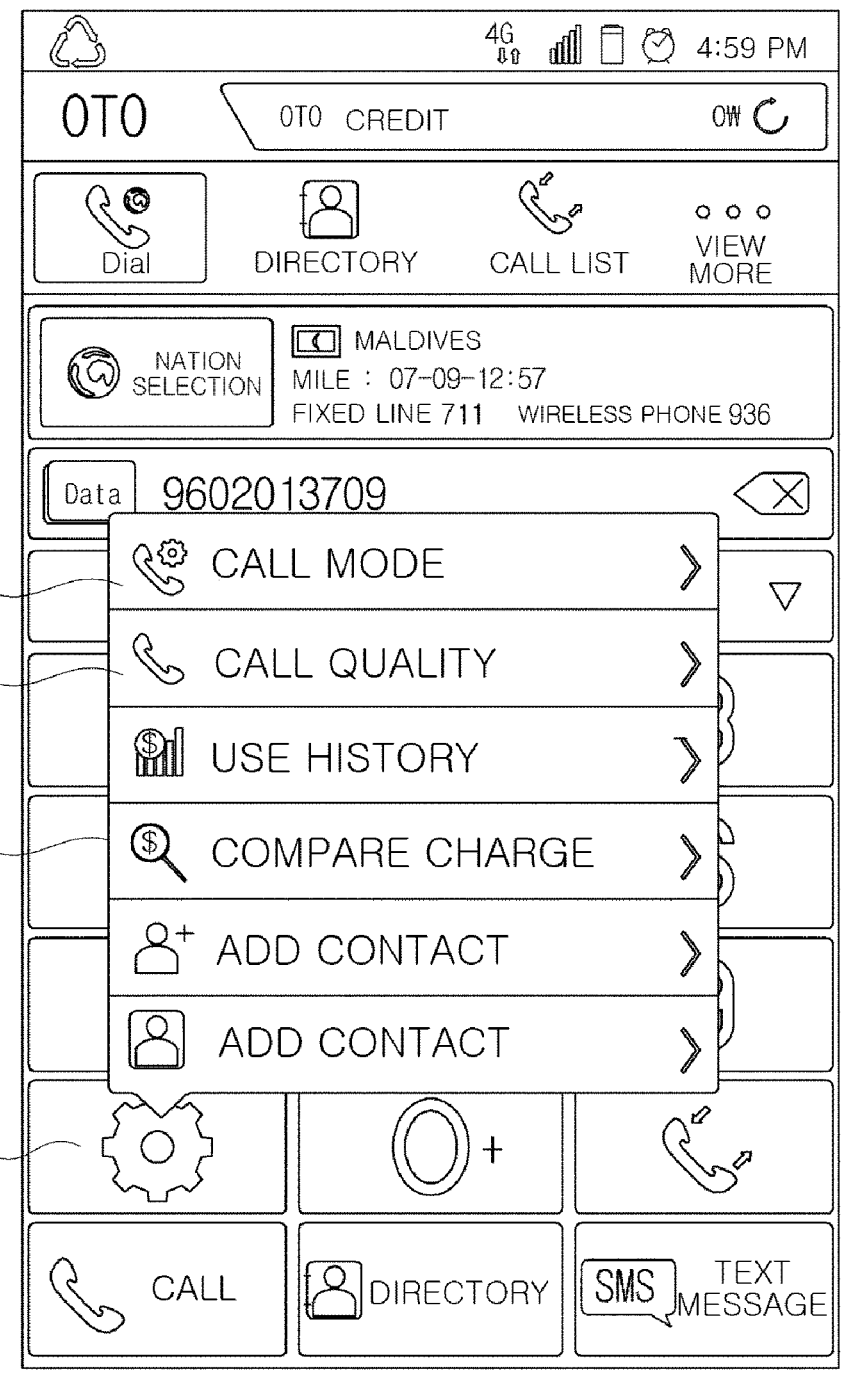

FIG. 6 illustrates an example of an interface displayed on the touch screen when the call mode setting menu illustrated in FIG. 3 is selected by the user.

Referring to FIG. 6, as sub menus for the call mode setting menu 105, a call mode menu 105b, a call quality test menu 105c, and a charge comparing menu 105a may be displayed on the touch screen. Among the sub menus, the charge comparing menu 105e corresponds to a menu for displaying the tariff per hour information according to positions of the originator mobile terminal 100 and the receiver mobile terminal 300, the call mode menu 105b corresponds to a menu for displaying guidance information for the call mode, for example, the voice mode and the data communication mode, on the touch screen, and the call quality test menu 105c may be provided for testing call quality with the receiver mobile terminal 300 before the user of the originator mobile terminal 100 performs call connection to the receiver mobile terminal 300.

Figure 7:
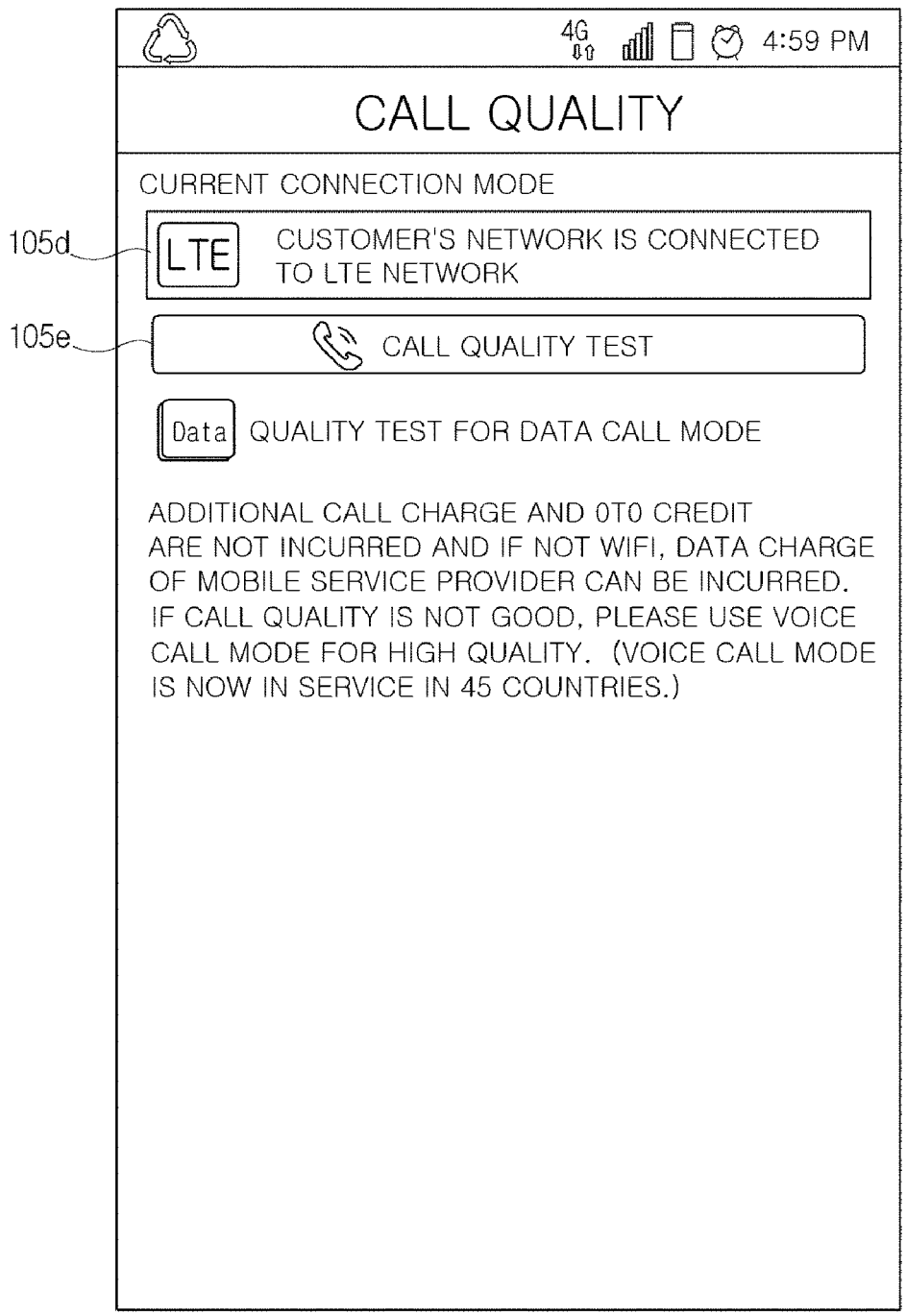
Figure 8:
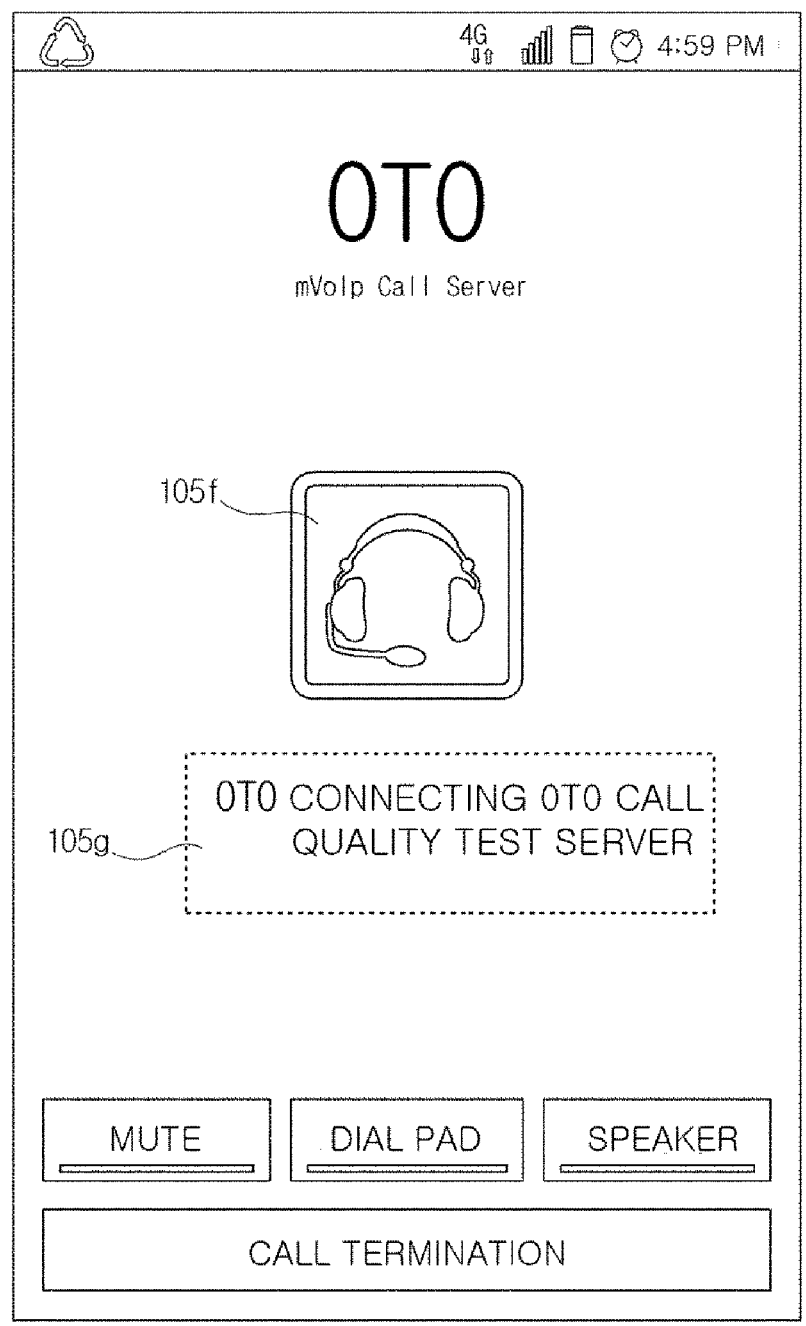
Figure 9:
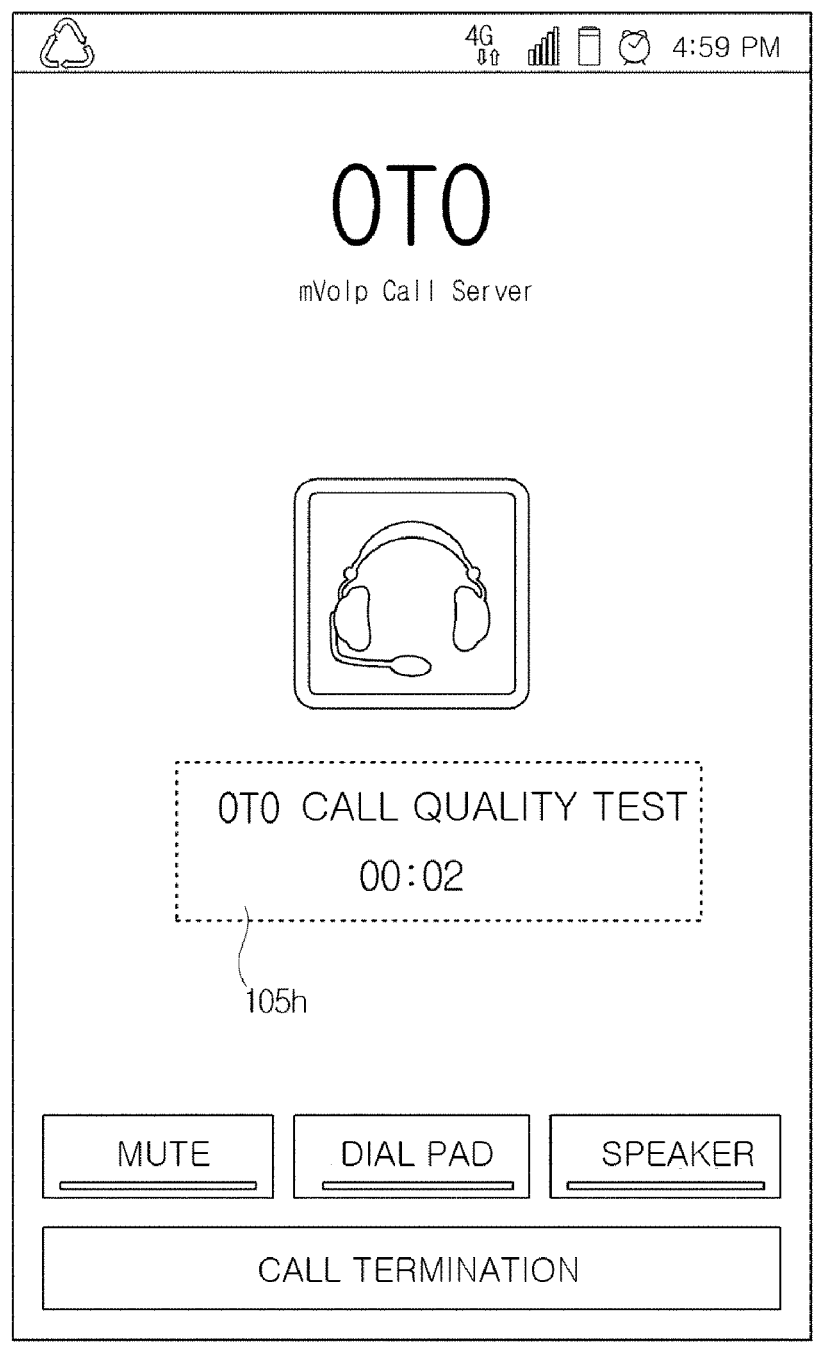

Here, a description about the call quality test menu 105c will be provided with reference to FIGS. 7 to 9.

FIG. 7 illustrates a sub interface displayed on the touch screen when the call quality test menu 105c is selected by the user in FIG. 6.

In FIG. 7, a guiding message 105d for guiding a type (e.g. an LTF network of a mobile service provider) of communication network to which the originator mobile terminal 100 is connected and a call quality test button 105e are displayed.

According to FIG. 7, it may be seen that the originator mobile terminal 100 connects to an LTE network among communication networks of the mobile service providers and performs data communication, and connects to a data communication network for data communication in the LTE network.

In FIG. 7, when the user of the originator mobile terminal 100 touches the call quality test button 105e, a sub interface illustrated in FIG. 8 may be displayed on the touch screen. In the interface illustrated in FIG. 8, a test icon 105f may be displayed on the center part of the touch screen and below, a guiding message 105g for notifying that a test pattern has been obtained from the service system 200 may be displayed. When obtaining the test pattern from the service system 200, the originator mobile terminal 100 may play the test pattern back. The interface at the time of playing back is as illustrated in FIG. 9. Here, the test pattern may correspond to a standard voice file for each call mode.

Figure 10:
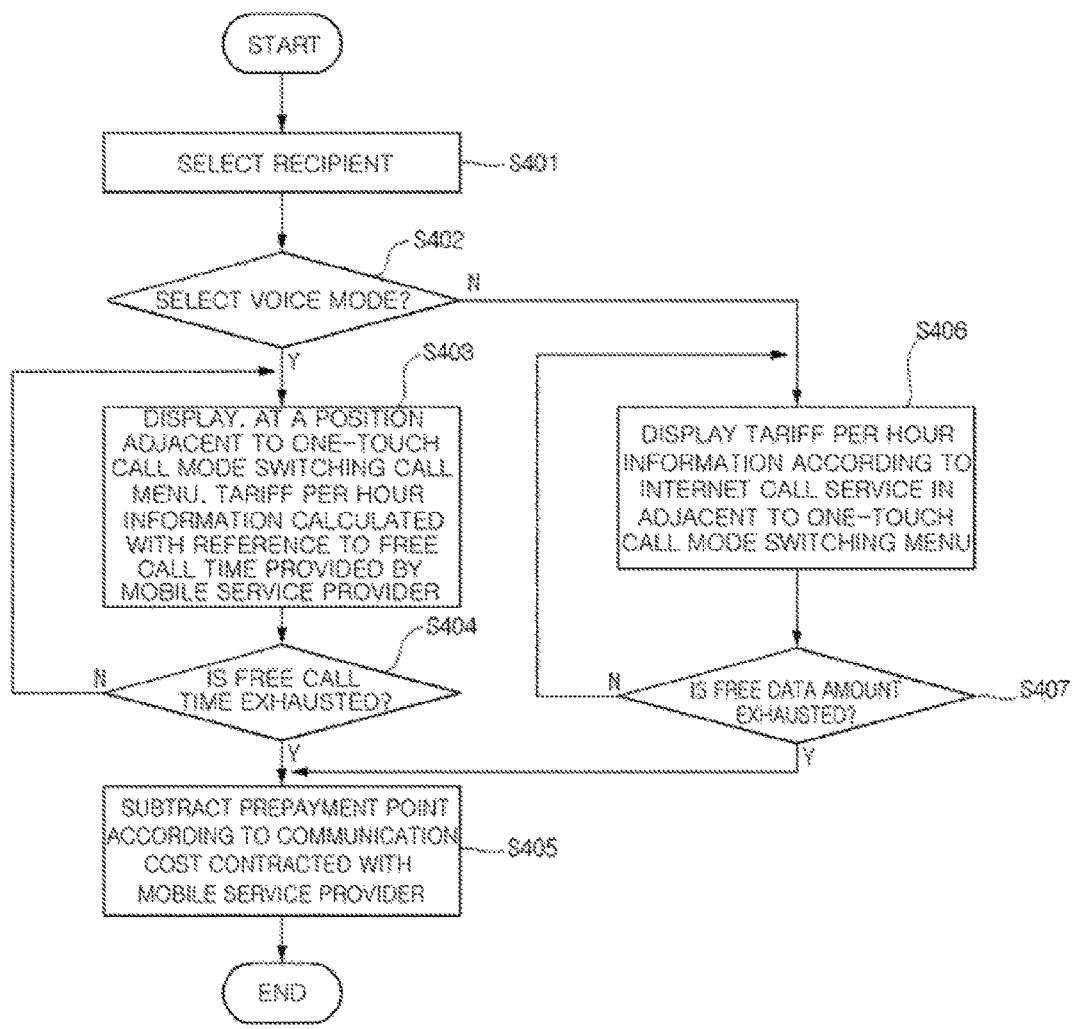
FIG. 10 illustrates a flowchart of a method for controlling a one-touch call mode of a mobile terminal according to an embodiment of the present invention.

FIG. 10 illustrates a flowchart of a method for controlling a call mode according to an embodiment of the present invention. A description about FIG. 10 will be provided with reference to FIGS. 1 to 9.

Referring to FIG. 10, firstly, the originator mobile terminal 100 may select a recipient (e.g. reception area) (step S401) and select the one-touch call mode switching menu 102b provided in the app to select one of the voice mode and the data communication mode. The app installed in the originator mobile terminal 100 determines whether a user-selected call mode is the voice mode (step S402).

When the user-selected mode is the voice mode, the app may figure out the tariff per hour information 102b according a free call time provided by a mobile service provider and display the tariff per hour information 102b on the touch screen (step S403). At this point, the tariff per hour information 102b may be disposed adjacent to the one-touch call mode switching menu 102b to allow associates to be disposed adjacent to each other and through this, the user may easily figure out the tariff per hour information changed by the one-touch call mode switching menu 102.

On the other hand, the app may determine whether the originator mobile terminal 100 has exhausted available free call time (step S404), and as the determination result, when the free call time is exhausted, may update the tariff per hour information in the voice mode. The app may subtract a prepayment point having been charged in the service system 200 by the originator mobile terminal 100 with reference to usage fees of the data communication networks 62 and 63 (step S405), which are contracted between the originator mobile terminal 100 and the mobile service providers.

On the other hand, in step S402, when the call mode selected by the originator mobile terminal 100 is not the voice mode, the app may determine that the mode selected by the originator mobile terminal 100 is the data communication mode and display, on the touch screen, a communication tariff per hour for an internet call network constructed by using the Wi-Fi network, 3G network, or 4G network (e.g. LTE network), etc. (step S406). At this point, the communication tariff per hour may be displayed to be adjacent to the one-touch call mode switching menu 102b. Finally, the app may determine whether a free data amount for the data communication mode is exhausted (step S407). When the free data communication amount contracted with the mobile service provider is exhausted, the originator mobile terminal 100 should pay for the data communication charge according to a contract with the mobile service provider and the data communication charge may be processed by subtracting the prepayment point having been charged in the service system 200 (step 405).

The invention claimed is:

1. A method for controlling one-touch call mode of a mobile terminal, the method comprising:
    displaying, on one area of a touch screen, a one-touch call mode switching menu for alternately switching between a voice mode and a data communication mode at each user selection; and
    displaying, adjacently to the one-touch call mode switching mode, tariff per hour information prescribed according to a user-selected area for a user-selected mode between the voice mode and the data communication mode, wherein:
        the tariff per hour information is calculated with reference to the user-selected mode and the user-selected area to be displayed on the touch screen every time the voice mode and the data communication mode are switched;
        when the user selects the voice mode, then the mobile terminal (i) determines and displays the tariff per hour information according to a free call time provided by a mobile services provider, (ii) determines when the free call time is exhausted, and (iii) updates the tariff per hour information in the voice mode; and
        when the user does not select the voice mode, then the mobile terminal (i) determines and displays the tariff per hour information according to the data communication mode, (ii) determines when a free data amount for the data communication mode is exhausted, and (iii) subtracts a prepayment point from a data communication charge according to a contract with the mobile services provider.

2. The method of claim 1, wherein the one-touch call mode switching menu is configured with an overlap icon, in which first and second icons respectively corresponding to the voice mode and the data communication mode overlap, and is displayed on the touch screen.

3. The method of claim 2, wherein the first and second icons have positions mutually switched every time the user selects.

4. The method of claim 1, wherein the voice mode and the data communication mode respectively correspond to a call mode using a voice communication network and a call mode using a data communication network.

5. The method of claim 1, wherein displaying adjacently to the one-touch call mode switching menu comprises calculating the tariff per hour information with reference to a free call time provided by a mobile service provider and displaying the tariff per hour information on the touch screen, when the user-selected mode is the voice call mode.

6. The method of claim 1, wherein the tariff per hour information is configured with first tariff per hour information for the voice mode and second tariff per hour information for the data communication mode, and is disposed and displayed to be adjacent on the touch screen, and
    one, which corresponds to the user-selected mode, between the first and second tariff per hour information is highlighted and displayed on the touch screen.

7. The method of claim 6, wherein any one of the first and second tariff per hour information is represented with a color different from that of the other, flickers, or is represented with a bold character type to be highlighted.

8. The method of claim 1, further comprising:
    displaying a call mode guiding message for guiding a use of the voice mode or the data communication mode on the touch screen, when the one-touch call mode switching menu is selected by the user, after displaying adjacently to the one-touch call mode switching mode.

9. The method of claim 8, wherein the call mode guiding message is displayed on the touch screen for a display time of 0.5 second to 5 seconds and then blind-processed.

10. The method of claim 1, further comprising:
    displaying, on the touch screen, a call quality test menu for receiving test voice signals respectively corresponding to the voice mode and the data mode from a test server, which is connected through a wireless network, and playing back the test voice signals.

11. The method of claim 10, wherein the call quality test menu comprises a network guiding menu for guiding a type of the wireless network, to which the mobile terminal is being connected, and a voice signal request menu for requesting the test voice signals from the test server.

* * * * *